(12) United States Patent
Markfort

(10) Patent No.: US 10,196,081 B2
(45) Date of Patent: Feb. 5, 2019

(54) LOCKING DEVICE FOR LOCKING A MOVABLE COMPONENT

(71) Applicant: TAKATA AG, Aschaffenburg (DE)

(72) Inventor: Dieter Markfort, Berlin (DE)

(73) Assignee: TAKATA AG, Aschaffenburg (DE)

( * ) Notice: Subject to any disclaimer, the term of this patent is extended or adjusted under 35 U.S.C. 154(b) by 233 days.

(21) Appl. No.: 14/414,857

(22) PCT Filed: Jul. 2, 2013

(86) PCT No.: PCT/EP2013/063904
§ 371 (c)(1),
(2) Date: Jan. 14, 2015

(87) PCT Pub. No.: WO2014/012785
PCT Pub. Date: Jan. 23, 2014

(65) Prior Publication Data
US 2015/0151779 A1    Jun. 4, 2015

(30) Foreign Application Priority Data

Jul. 18, 2012  (DE) .................. 10 2012 212 634
Oct. 25, 2012  (DE) .................. 10 2012 219 548

(51) Int. Cl.
 *B62D 5/00* (2006.01)
 *G05G 5/00* (2006.01)
(Continued)

(52) U.S. Cl.
CPC .......... *B62D 5/008* (2013.01); *E05B 17/0041* (2013.01); *E05B 47/0004* (2013.01);
(Continued)

(58) Field of Classification Search
CPC ........ B62D 5/008; B62D 1/184; G05G 5/005; G05G 5/14; G05G 5/20; B60R 25/02153;
(Continued)

(56) References Cited

U.S. PATENT DOCUMENTS 3,973,793 A * 8/1976 Hirst, Jr. ............. B62D 33/071
   292/144
4,558,293 A * 12/1985 Haneda ................ H01F 7/1615
   310/30

(Continued)

FOREIGN PATENT DOCUMENTS

DE        102 45 951 A1    4/2004
DE   10 2010 037 384 A1    3/2012
(Continued)

OTHER PUBLICATIONS

International Search Report dated Mar. 31, 2014 for PCT/EP2013/063904. (4 pages).

(Continued)

*Primary Examiner* — Joseph M Rocca
*Assistant Examiner* — Maurice L Williams
(74) *Attorney, Agent, or Firm* — Fitch, Even, Tabin & Flannery LLP

(57) ABSTRACT

The invention relates to a locking device for locking a movable component, in particular a superposition drive of a superimposed steering system, comprising a locking element reciprocatable between a locking position and a release position, which in the locking position cooperates with a movable component located outside a housing of the locking device; and a damping device which damps a movement of the locking element into the release position. The damping device comprises a damping element with a damping portion which is located outside the housing of the locking device. The locking device is designed such that during a movement of the locking element into the release position an end of the locking element moves out of the housing of the locking device and impinges on the damping portion.

15 Claims, 2 Drawing Sheets

(51) Int. Cl.
  *E05B 17/00* (2006.01)
  *E05B 47/00* (2006.01)
  *E05B 47/02* (2006.01)
(52) U.S. Cl.
  CPC ............. *E05B 47/02* (2013.01); *G05G 5/005* (2013.01); *Y10T 74/20636* (2015.01)
(58) Field of Classification Search
  CPC ......... B60R 25/02113; Y10T 292/1021; Y10T 292/688; Y10T 292/696; Y10T 292/699; Y10S 292/56; E05B 2015/0472; E05B 2015/0475; E05B 2015/0479; E05B 17/0041; E05B 17/0045; E05B 77/42; E05B 47/00; E05B 47/0001; E05B 47/0002; E05B 47/0003; E05B 47/02; E05B 47/026; E05B 81/08; E05B 81/18; E05B 17/00; E05B 47/0004; E05B 47/0044
  USPC ........... 70/182–186, 275–278.1; 292/341.12, 292/144, 341.15, 341.16, DIG. 56
  See application file for complete search history.

(56) References Cited

U.S. PATENT DOCUMENTS

| | | | | | |
|---|---|---|---|---|---|
| 4,701,823 | A | * | 10/1987 | Sakurai | G11B 5/5521 360/267 |
| 4,730,471 | A | * | 3/1988 | Seckinger | E05B 47/0619 70/277 |
| 5,032,812 | A | * | 7/1991 | Banick | F16K 31/082 335/17 |
| 5,157,448 | A | * | 10/1992 | Lang | G03G 15/6502 271/157 |
| 5,896,765 | A | * | 4/1999 | Peyre | B60R 25/02153 292/144 |
| 6,092,957 | A | * | 7/2000 | Fevre | B62D 1/184 280/775 |
| 2001/0040492 | A1 | * | 11/2001 | Hyatt, Jr. | E05B 47/0002 335/258 |
| 2005/0093281 | A1 | * | 5/2005 | Nishioka | B62D 1/184 280/775 |
| 2005/0279867 | A1 | * | 12/2005 | Ismailov | F02D 41/20 239/585.1 |
| 2006/0225985 | A1 | * | 10/2006 | Dimig | B60N 2/442 192/84.1 |
| 2006/0237959 | A1 | * | 10/2006 | Dimig | B60N 2/444 280/776 |
| 2007/0034442 | A1 | | 2/2007 | Inoue | |
| 2009/0139356 | A1 | * | 6/2009 | Inoue | B62D 5/008 74/393 |
| 2010/0164661 | A1 | * | 7/2010 | Sohn | H01F 7/1615 335/229 |
| 2012/0024617 | A1 | | 2/2012 | Markfort et al. | |
| 2013/0324345 | A1 | * | 12/2013 | Asakura | B62D 5/008 475/198 |
| 2014/0000976 | A1 | | 1/2014 | Markfort | |
| 2015/0143946 | A1 | * | 5/2015 | Mitre | B62D 1/10 74/527 |
| 2015/0144416 | A1 | * | 5/2015 | Marotzke | B62D 1/10 180/400 |

FOREIGN PATENT DOCUMENTS

| | | |
|---|---|---|
| EP | 1 747 970 A1 | 1/2007 |
| JP | 2007-269057 A | 10/2007 |
| WO | 2010/115707 A1 | 10/2010 |
| WO | 2012/120079 A1 | 9/2012 |

OTHER PUBLICATIONS

English Translation of International Preliminary Report on Patentability dated Jan. 20, 2015 for PCT/EP2013/063904.

Japanese Office Action dated Nov. 15, 2016 for Japanese Patent Application No. 2015-522028. (5 pages).

* cited by examiner

LOCKING DEVICE FOR LOCKING A MOVABLE COMPONENT

CROSS-REFERENCE TO RELATED APPLICATIONS

This application is a U.S. National Phase Patent Application of International Patent Application Number PCT/EP2013/063904, filed on Jul. 2, 2013, which claims priority of German Patent Application Number 10 2012 212 634.1, filed Jul. 18, 2012, and of German Patent Application Number 10 2012 219 548.3, filed on Oct. 25, 2012, which are hereby incorporated herein by reference in their entirety.

BACKGROUND

The invention relates to a locking device for locking a movable component, in particular a superposition drive of a superimposed steering system of a motor vehicle.

In operation of a locking device of a superposition drive unwanted noise can be generated, in particular when a locking element of the locking device is moved into a locking or a release position (i.e. into one of its end positions), so that for locking a rotating drive of the superposition drive the locking element can mechanically be brought in engagement with the same or the rotating drive can be released. The development of noise can be caused both by the locking element reciprocated between the locking position and the release position and by components which drive the locking element. What can be particularly disturbing is noise in the direct hearing range of a person (in its direct vicinity), as it can be produced for example in a superposition drive arranged in a steering wheel of a motor vehicle. The problem of the generation of noise does of course not only exist during locking of a superposition drive, but it generally arises during locking of a movable component, e.g. also during locking of a linearly moving component.

From DE 10 2010 037 384 A1 there is known a locking apparatus for a superposition steering system with an electromagnetic actuator. The latter drives a locking pin serving as locking element. To avoid a direct mechanical contact between the locking pin and other components of the actuator, elastic O-rings are provided in the end positions of the locking pin. In such arrangement it is disadvantageous that the O-rings merely provide a small deformation path, which imposes certain limits on a design of the course of force during braking of the locking element. The use of air or oil dampers, which furthermore is proposed in the above-mentioned document, is expensive. The space requirement also can be high, which especially in the case of superposition drives arranged in the steering wheel can lead to installation space problems.

SUMMARY

It is the object underlying the invention to provide a locking device for locking a movable component with as little operating noise as possible.

According to the invention, there is provided a locking device for locking a movable component, in particular a superposition drive of a superimposed steering system, comprising a locking element reciprocatable between a locking position and a release position, which in the locking position cooperates with a movable component located outside the housing of the locking device; and a damping device which damps a movement of the locking element into the release position, wherein the damping device includes a damping element with a damping portion which is located outside the housing of the locking device, and wherein the locking device is designed such that during a movement of the locking element into the release position, an end of the locking element moves out of the housing of the locking device or away from the same and impinges on the damping portion.

The locking device for example serves to lock a superposition drive of a superimposed steering system of a vehicle by mechanical action, so that e.g. in the case of a malfunction of the superposition drive an introduction of a steering angle into the steering shaft by the superposition drive is prevented. A possible configuration of the superposition drive and its attachment to the steering wheel and with the steering shaft are described e.g. in WO 2010/11 57 07 A1, to which reference in so far is made expressly.

The locking element in particular is an oblong element which in the mounted condition and in its locking position cooperates with a movable component in the form of a rotatable element (e.g. in the form of a locking disk) of the superposition drive, wherein the locking disk is non-rotatably coupled with a drive worm (in particular with a free end of the drive worm protruding out of the housing of the superposition drive). Along its outer circumference, for example, the locking disk includes cutouts into which a (first) free end of the locking element reaching out of the housing of the locking device engages and in particular chiefly positively locks the locking disk, so that the drive worm coupled with the locking disk also is blocked. The release position in particular is a further end position of the locking element, in which the locking element has its greatest distance to the movable component to be locked.

In connection with the configuration of the locking element and an apparatus for moving the locking element reference is made to WO 2012/120079, to which reference in so far is made expressly.

The use of the locking apparatus according to the invention, however, is not limited to the locking (i.e. a positional fixation) of a superposition drive. Rather, the locking apparatus can serve for locking a basically arbitrary movable component or a movable assembly, e.g. for locking a linearly moving component.

With one portion, the locking element extends within a receptacle formed by the housing (for example in the form of a cavity), wherein at least in the locking position a first (free) end of the locking element and in the release position a second (free) end of the locking element protrude out of openings of the housing defining the receptacle. It is of course also conceivable that independent of the position of the locking element both its first and its second end are located outside the housing.

The arrangement of the damping element externally (i.e. outside the housing of the locking device) in particular provides for a compact construction of the locking device and thus for its space-saving arrangement in a steering wheel.

The damping element (at least its damping portion) of the locking device according to the invention in particular is formed elastic, wherein it e.g. includes an elastic material (such as an elastomer) or is formed of an elastic material. It is also possible that the damping element is formed in the form of a spring. The damping element in particular is a one-piece component (such as a molded part). The design of the damping element as one-piece component (in particular as molded element), which beside damping of the locking element during a movement into the release position can take over further functions (see below), in particular represents an inexpensive possibility for creating a rather good damping of the locking element (and e.g. also of further movable parts of the locking device cooperating with the locking element) during a movement into the release position (and e.g. also during a movement into the locking position).

In addition, the damping element can be arranged at a distance to the housing of the locking device (in particular to a receptacle formed by the housing, in which a section of the locking element extends). It is also conceivable that the housing forms a fixing region at which the damping element is fixed, wherein the fixing region in particular is located at a distance to a main region of the housing which forms the receptacle for the locking element.

The fixing region in particular is formed continuously (massive) and e.g. integrally with the main region of the housing; for example in the form of a protrusion which in particular extends along the direction of extension of the locking element away from the main region of the housing. It is also conceivable that the damping element is fixed at the fixing region of the housing with a fixing portion and extends e.g. through the fixing region of the housing or into the fixing region (see below). The damping portion of the damping element, onto which the locking element impinges, however is located outside the housing.

According to another aspect of the invention, the damping element includes a fixing portion as mentioned already, via which it can be fixed at the housing of the locking device and/or at a housing of the movable component to be locked (e.g. a housing of a superposition drive). The housing of the locking device e.g. includes a fixing region with a through opening, wherein the fixing portion of the damping element comprises a circumferential groove into which the edge of the through opening of the fixing region of the housing engages.

The circumferential groove is formed e.g. by an edge of a through opening of the fixing portion of the damping element, wherein the groove is formed for instance in a (in particular hollow cylindrical) side wall defining the through opening.

According to another development of the invention, the damping portion of the damping element extends at an angle to the fixing portion of the damping element. The damping portion comprises e.g. two legs spaced from each other, which are connected with each other via a connecting region, wherein the locking element impinges onto the connecting region during a movement into the release position. The legs in particular extend at an angle to the locking element (i.e. to a main direction of extension of the locking element) or to a direction of movement of the locking element. Correspondingly, the connecting region can be formed in the form of a flat element (for example in the form of a flat web), which in particular likewise extends at an angle (e.g. at least approximately vertically) to the locking element.

It is also conceivable that the damping element—when the locking device is mounted on an apparatus (for example a superposition drive) comprising the movable component to be locked—supports on a portion (in particular likewise extending at an angle to the locking element) of a housing of the apparatus via the legs. When the (second) end of the locking element impinges on the connecting region of the (in particular one-part) damping element, the legs and/or the connecting region in particular are deformed elastically.

In addition, the fixing portion of the damping element can be formed such that via the damping element the locking device can elastically be mounted on a housing of an apparatus (for example a superposition drive) comprising the movable component to be locked. Thus, the damping element can have two functions, namely on the one hand damping of the movement of the locking element into the release position, in order to counteract a development of noise connected with this movement, and on the other hand realizing an elastic support of the entire locking device on the housing of the apparatus with the movable component, in order to reduce the development of noise during operation of the locking device, particular during a movement of the locking element also into the locking position.

The invention also relates to a superposition drive of a superimposed steering system of a motor vehicle with a movable component and a locking device, wherein the locking device includes:
 a locking element reciprocatable between a locking position and a release position, which in the locking position cooperates with the movable component; and
 a damping device which damps a movement of the locking element into the release position,
 wherein the damping device includes a damping element with a damping portion which is located outside a housing of the locking device,
 and wherein the locking device is designed such that during a movement of the locking element into the release position, an end of the locking element moves out of the housing of the locking device or away from the same and impinges on the damping portion.

In addition, it is possible that a fixing element (e.g. in the form of a bolt or a screw) reaches through a through opening of a fixing region (as described above) of the housing of the locking device and through a through opening of a fixing portion (as also described above) of the damping element and engages into a fixing hole of a housing of the superposition drive. In this variant, the damping element thus is fixed both at the fixing region (formed e.g. as protrusion) of the housing of the locking device and at the housing of the superposition drive.

The movable component in particular is located outside a housing of the locking device.

BRIEF DESCRIPTION OF THE DRAWINGS

The invention will subsequently be explained in detail by means of exemplary embodiments with reference to the Figures.

DETAILED DESCRIPTION

Figure 1:
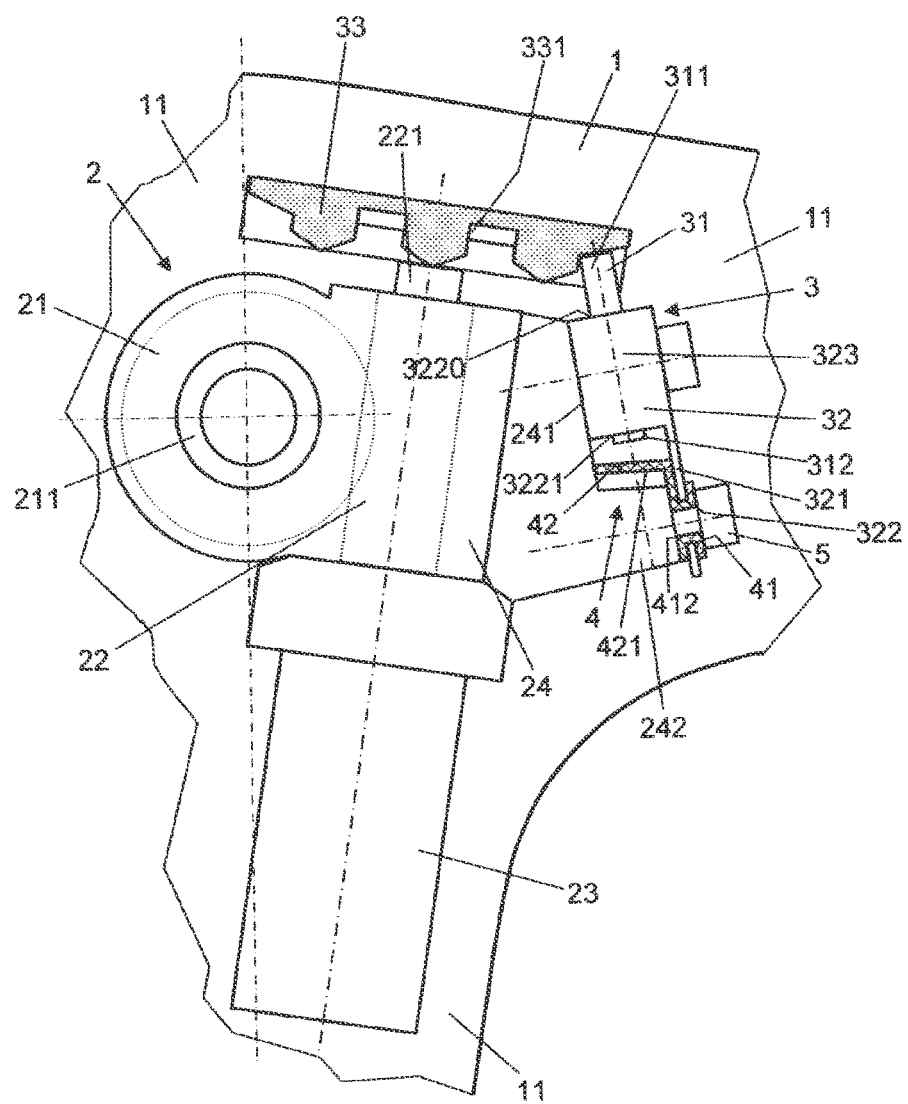
FIG. 1 shows a part of a steering wheel with a superposition drive which comprises a locking device according to the invention.

FIG. 1 shows a section of a steering wheel 1 of a motor vehicle, in whose hub and/or spoke region (including three spokes 11) a superposition drive 2 is arranged, with which an additional steering angle can be imposed on a steering shaft of the vehicle, which is superimposed on a steering angle introduced into the steering shaft by turning a steering wheel rim of the steering wheel.

The superposition drive 2 in particular is arranged on a side of the steering wheel 1 facing away from the driver and includes a drive worm 22 meshing with a worm gear 21. The worm gear 21 is coupled with the steering shaft of the vehicle via an extension 211 which protrudes from a housing 24 of the superposition drive 2, so that a rotary movement of the worm gear 21 is transmitted to the steering shaft. The drive of the drive worm 22 is effected via an actuator 23, which in particular is formed in the form of an electric motor. Possible configurations of further components of the superposition drive shown in FIG. 1 and its attachment to the steering wheel and with the steering shaft are described e.g. in the above-mentioned WO 2010/11 57 07 A1.

The steering wheel 1 furthermore includes a locking device 3 according to the invention separate from the superposition drive 2, which serves to lock the superposition drive 2 by mechanical action; for example to ensure a safe introduction of a steering angle into the steering shaft by a torque applied by the driver via the steering wheel rim of the steering wheel in the case of a failure of the superposition drive or in its non-active condition.

The locking device 3 includes a locking element in the form of a locking bolt 31, which via an (e.g. electromagnetic) actuator is axially movable from a release position into the locking position shown in FIG. 1. This is accomplished e.g. by an interruption of the power supply (deactivation) to an electromagnet (not shown) of the actuator, whereby a holding force exerted on the locking bolt 31 is eliminated and the locking bolt 31 is transferred into the locking position by the action of spring elements (not shown either). To again move the locking bolt 31 from the locking position into the release position, the holding force is built up again by energizing (activating) the electromagnet of the actuator, whereby the locking bolt 31 is brought into the release position by biasing the above-mentioned spring elements and is maintained in this release position.

The actuator of the locking device 3 and at least a section of the locking bolt 31 are located in the interior of a housing 32, wherein in the locking position the locking bolt 31 protrudes from a first opening 3220 of the housing 32 with a first end 311 (locking end) and in a release position protrudes from a second opening 3221 with a second end 312, wherein the openings 3220, 3221 can serve as guide for the locking bolt 31, i.e. the locking bolt 31 can rest against the edge of the openings 3220, 3221. It is, however, also possible that additional means for guiding the locking bolt 31 are provided, e.g. sleeves separate from the housing 32 (in particular arranged in the openings 3220, 3221). In this connection, reference is made to the fact that the end 312 of the locking bolt 31 can protrude from the opening 3221 already before start of the movement into the release position and in the case of the mentioned movement merely the distance between the end 312 and the housing 32 is increased. The same of course also applies for the end 321 and the opening 3220 in connection with the movement into the locking position.

The locking bolt 31 in particular is a one-piece element. It is, however, also possible that the locking bolt 31 comprises a first element, which forms the first free end 311, and a second element separate from the first element, at which the second end 312 is formed, wherein the two elements are firmly connected with each other.

The housing 32 of the locking device 3 rests against a flange-like abutment portion 241 of the housing 24 of the superposition drive 2 and in particular is attached to the housing 24 (e.g. by means of suitable fastening elements, such as in the form of screws). In its locking position, the locking bolt 31 cooperates with a movable (rotatable) component of the superposition drive 2 in the form of a locking disk 33, wherein the locking disk 33 is non-rotatably coupled with a free end 221 of the drive worm 22 protruding out of the housing 24 of the superposition drive 2. Along its outer circumference, the locking disk 33 also includes cutouts 331 into which the first free end 311 of the locking bolt 31 reaching out of the housing 32 of the locking device 3 engages and most of all positively locks the locking disk 33, so that the drive worm 22 coupled with the locking disk 33 also is blocked.

During the movement of the locking bolt 31 into the locking position, the first end 311 of the locking bolt 31 is brought in mechanical contact with the locking disk 33, i.e. a force is introduced into the locking bolt 31, which can lead to e.g. vibrations which propagate onto the steering wheel rim of the steering wheel. To suppress such vibrations and a noise development connected with the vibrations as far as possible, the steering wheel can include bearing means via which the locking device 3 is elastically mounted on the superposition drive 2. In this connection reference also is made e.g. to WO 2012/120079.

To suppress a development of noise also during the movement of the locking bolt 31 into the release position, the locking device 3 includes a damping device in the form of an elastic damping element 4 which is connected with a fixing region of the housing 32 of the locking device 3, which is formed as strap-like extension 321. The extension 321 protrudes from a main region 323 (formed substantially cuboid) of the housing 32, in which the locking bolt 31 extends, to the rear (i.e. away from the locking disk 33) and in particular extends in a substantially planar fashion and substantially parallel to the locking bolt 31. It is conceivable that the extension 321 is integrally connected with the remaining housing 32 (in particular with the main region 323 of the housing 32). It is, however, also possible that the extension 321 is a separate part which via fixing means is fixed at the main region 323 of the housing 32.

The damping element 4 includes a damping portion 42 which is arranged outside the housing 32 such that during a movement of the locking bolt 31 into the release position the second free end 312 of the locking bolt impinges on the damping portion 42. The damping portion 42 thus damps the movement of the locking bolt 31 and a development of noise connected with this movement.

Figure 2:
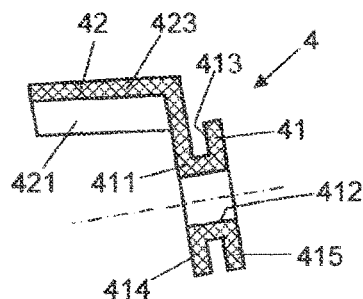
FIG. 2 shows a sectional view of the damping element of the locking de-vice shown in FIG. 1.

The damping element 4 in addition includes a fixing portion 41 integrally connected with the damping portion 42, via which it is fixed at the extension 321 of the housing 32. More exactly, the fixing portion 41 is formed sleeve-like and comprises a through opening 412 defined by a hollow cylindrical side wall 411 (cf. FIG. 2). In the side wall 411, there is formed a ring-shaped groove 413 extending around the through opening 412, which separates two disk-shaped portions 414, 415 of the fixing portion 41 from each other. The hollow cylindrical side wall 411 is inserted into a through opening 322 of the extension 321 of the housing 32 such that an edge of the through opening 322 engages into the groove 413, so that the damping element 4 is fixed at the extension 321. The disk-shaped regions 414, 415 then are located on different sides of the extension 321.

The extension 321 of the housing 32 and the fixing portion 41 of the damping element 4 in turn are connected with a dome-like or frustoconical connecting portion 242 of the housing 24 of the superposition drive 2 by means of a fixing element in the form of a screw 5, which reaches through the (in particular coaxial) through openings 322, 412. The screw 5 is screwed into an opening of the connecting portion 242 of the housing 24. Furthermore, the fixing portion 41 of the damping element 4 rests on an end face of the connecting portion 242 with a bottom side of the lower disk-shaped region 414 facing away from the extension 321 of the housing 32, so that the lower disk-shaped region 414 is located between the connecting portion 242 of a bottom side of the extension 321 facing the connecting portion 242.

By means of the elastic fixing portion 41 of the damping element 4, an elastic support of the housing 32 of the locking device 3 is realized, so that the housing 32 can perform a compensation movement relative to the housing 24 of the superposition drive, whereby in particular a generation of noise during the movement of the locking bolt 31 into the locking position is counteracted.

At the same time, the damping element 4 also damps the movement of the locking bolt 31 into the release position, as mentioned already. The damping portion 42, on which the locking bolt 31 impinges during a movement into the release position, serves this purpose. The damping portion 42 correspondingly extends at an angle to the fixing portion 41 of the damping element 4 and thus at an angle also to the locking bolt 31 or its direction of movement.

The damping portion 42 is formed such that it is deformed elastically (reversibly) on impingement of the second end 312 of the locking bolt 31, in order to gradually slow down the locking bolt. For this purpose, the damping portion 42 includes two legs 421, 422 extending at a distance from each other and at an angle to the locking bolt 31, which are (in particular integrally) connected with each other via a web (impingement surface) 423 like-wise extending at an angle to the locking bolt 31. The damping portion 42 (vertically to the axis of the through openings 322, 412) hence obtains a substantially U-shaped cross-section.

Figure 3:
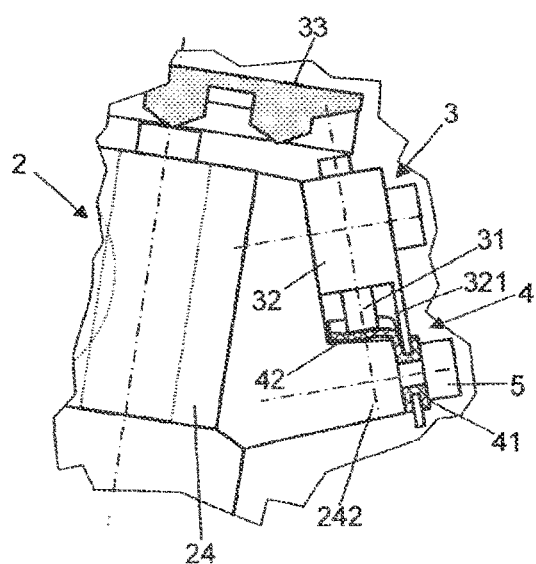
FIG. 3 shows a section of FIG. 1, wherein the locking element of the locking device is in the release position.
Figure 4A:
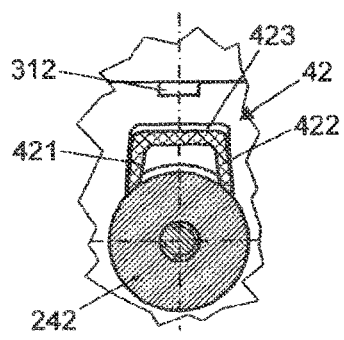
FIG. 4A shows a sectional view of the damping element of the locking de-vice of FIG. 1, wherein the locking element is not in the release position.
Figure 4B:
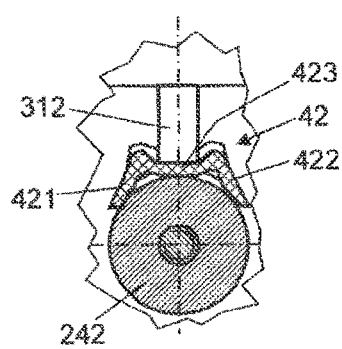
FIG. 4B shows the damping element of FIG. 4A after moving the locking element into the release position.

With a side facing away from the locking bolt 31, the legs 421, 422 each support on an outside of the connecting portion 242 of the housing 24 of the superposition drive 2 facing the locking bolt 31 (or rest against the same). This is shown in FIG. 4A, where the situation before impingement of the locking bolt 31 on the damping portion 42 is shown. On impingement of the second end 312 of the locking bolt 31, the web 423 and the legs 421, 422 are deformed (FIGS. 3 and 4B).

Due to the deformation of the web 413 and the legs 421, 422, a relatively gentle braking of the locking bolt 31 is effected with reduced development of noise. By a corresponding design of the damping portion 42, the force which the same exerts on the locking bolt 31 can be influenced specifically. It is conceivable, for example, that directly after contact of the locking bolt 31 with the damping portion 42 a comparatively large force is opposed to the same as compared to a later stage of its movement into the release position, in order to initially brake the locking bolt 31 relatively strongly. This is achieved e.g. by the design of the web 413 of the two legs 421, 422, e.g. by their wall thickness, their distance and/or orientation to each other or to the dome-like connecting portion 242 of the housing 24 of the superposition drive 2.

In the further course of the movement of the locking bolt 31 into the release position, the web 423 is at least sectionally pressed in (turned in) and the legs 421, 422 diverge in opposite directions along the outside of the housing 24 (cf. FIGS. 3 and 4B), whereby e.g. the force exerted on the locking bolt 31 by the damping portion 42 decreases. The force to be applied by the actuator of the locking device 3 (in the case of an electromagnetic actuator the current for the actuation) also is reduced thereby, which is necessary to hold the locking bolt 31 in its release position. It is conceivable that the legs 421, 422 di-verge to such an extent that the web 423 comes to rest against the outside of the connecting portion 242 of the housing 24, when the locking bolt 31 reaches the release position, as shown in FIG. 4B.

It should be noted that the explained exemplary embodiments relate to a use of the locking apparatus according to the invention for locking a superposition drive. It is, however, also possible to use the illustrated embodiments of the locking apparatus for locking another moving component, which is not part of a superposition drive.

LIST OF REFERENCE NUMERALS 1 steering wheel
2 superposition drive
3 locking device
4 damping element
5 screw
21 worm gear
22 drive worm
23 actuator
24 housing
31 locking bolt
32 housing
33 locking disk
41 fixing portion
42 damping portion
211 extension
221 free end of drive worm
241 contact portion
242 connecting portion
311 first end
312 second end
321 extension
322 through opening
323 main region
331 cutout
411 side wall
412 through opening
413 groove
414 first disk-shaped region
415 second disk-shaped region
421, 422 leg
423 web
3220, 3221 opening

The invention claimed is:
1. A locking device for locking a movable component of a superposition drive of a superimposed steering system, comprising:
   a locking element reciprocatable between a locking position and a release position, which in the locking position cooperates with the movable component located outside a housing of the locking device;
   an actuator for moving the locking element from the locking position into the release position and vice versa;
   wherein the actuator and the locking element are arranged together in the housing of the locking device; and
   a damping device which damps a movement of the locking element into the release position, wherein the damping device includes a damping element with a damping portion which is located outside the housing of the locking device, wherein the locking device is designed such that during a movement of the locking element into the release position, an end of the locking element moves out of the housing of the locking device or away from the housing of the locking device and impinges on the damping portion, and wherein the damping element includes a fixing portion to allow the damping element to be fixed at the housing of the locking device and/or at a second housing of an apparatus comprising the movable component to be locked.

2. The locking device according to claim 1, wherein at least the damping portion of the damping element is elastic.

3. The locking device according to claim 1, characterized in that wherein the damping portion of the damping element is arranged at a distance to a region of the housing of the locking device in which a section of the locking element extends.

4. The locking device according to claim 1, wherein the housing of the locking device includes a fixing region with a through opening, wherein the fixing portion of the damping element comprises a circumferential groove into which an edge of the through opening of the fixing region of the housing of the locking device or the second housing of the apparatus comprising the removable component to be locked engages.

5. The locking device according to claim 4, wherein the circumferential groove is formed by a side wall which defines a through opening of the fixing portion of the damping element.

6. The locking device according to claim 1, wherein the damping portion of the damping element extends at an angle to the fixing portion of the damping element.

7. The locking device according to claim 1, wherein the damping portion includes two legs spaced from each other, which are connected with each other via a connecting region, wherein during a movement into the release position the locking element impinges on the connecting region.

8. The locking device according to claim 7, wherein the connecting region extends at an angle to the locking element.

9. The locking device according to claim 1 wherein the fixing portion of the damping element is formed such that the locking device can elastically be mounted on a housing of the apparatus via the damping element.

10. A locking device for locking a movable component of a superposition drive of a superimposed steering system, comprising:
- a locking element reciprocatable between a locking position and a release position, which in the locking position cooperates with the movable component located outside a housing of the locking device;
- an actuator for moving the locking element from the locking position into the release position and vice versa;

wherein the actuator and the locking element are arranged together in the housing of the locking device; and a damping device which damps a movement of the locking element into the release position, wherein the damping device includes a damping element with a damping portion which is located outside the housing of the locking device, wherein the locking device is designed such that during a movement of the locking element into the release position, an end of the locking element moves out of the housing of the locking device or away from the housing of the locking device and impinges on the damping portion, and wherein the housing forms a fixing region at which the damping element is fixed.

11. The locking device according to claim 10, wherein at least the fixing region is formed in the form of a protrusion.

12. A superposition drive for a superimposed steering system of a motor vehicle with a movable component and a locking device, wherein the locking device comprises:
- a locking element reciprocatable between a locking position and a release position, which in the locking position cooperates with the movable component;
- an actuator for moving the locking element from the locking position into the release position and vice versa;

wherein the actuator and the locking element are arranged together in a housing of the locking device; and a damping device which damps a movement of the locking element into the release position, wherein the damping device includes a damping element with a damping portion which is located outside the housing of the locking device, wherein the locking device is designed such that during a movement of the locking element into the release position, an end of the locking element moves out of the housing of the locking device or away from the same and impinges on the damping portion, and wherein the damping element includes a fixing portion to allow the damping element to be fixed at the housing of the locking device and/or at a second housing of an apparatus comprising the movable component to be locked.

13. The superposition drive according to claim 12, wherein the locking device is elastically mounted on a housing of the superposition drive via the damping element.

14. The superposition drive according to claim 13, wherein a fixing element reaches through a through opening of a fixing region of the housing of the locking device and through a through opening of the fixing portion of the damping element and engages into a fixing hole of the housing of the superposition drive.

15. The superposition drive according to claim 12, wherein the movable component is located outside the housing of the locking device.

* * * * *